United States Patent

Salihi et al.

[11] Patent Number: 4,483,419
[45] Date of Patent: Nov. 20, 1984

[54] ELEVATOR MOTORING AND REGENERATING DYNAMIC GAIN COMPENSATION

[75] Inventors: Jalal T. Salihi, Manchester; Leca Boiucaner, Farmington, both of Conn.

[73] Assignee: Otis Elevator Company, Farmington, Conn.

[21] Appl. No.: 434,015

[22] Filed: Oct. 12, 1982

[51] Int. Cl.³ .......................... B66B 1/28; H02P 5/40
[52] U.S. Cl. .................................... 187/29 R; 318/759
[58] Field of Search ................. 187/29; 318/801–803, 318/757–759

[56] References Cited

U.S. PATENT DOCUMENTS

| | | | |
|---|---|---|---|
| 4,051,418 | 9/1977 | O'Berto et al. | 318/759 |
| 4,230,979 | 10/1980 | Espelage et al. | 318/759 X |
| 4,319,665 | 3/1982 | Komuro et al. | 187/29 |
| 4,327,315 | 4/1982 | Kawada et al. | 318/803 X |

Primary Examiner—S. J. Witkowski
Assistant Examiner—W. E. Duncanson, Jr.
Attorney, Agent, or Firm—Robert E. Greenstien

[57] ABSTRACT

A polyphase induction motor propels an elevator car. The motor is powered by a multiphase inverter which receives power from a battery. The inverter is controlled in such a way as to control the frequency and amplitude of the power supplied to the motor in order to control the motor's speed, acceleration, and slip. That inverter control is accomplished by sensing the motor's speed and in response providing predetermined slip and torque signals. The slip can be controlled over a range which can provide negative slip, by which power is regenerated into the battery, which is thereby charged, and positive slip for motoring torque. A charger also charges the battery. The motor and its controls are thereby ostensibly isolated from the power system that supplies power to the charger, the battery handling the peak power requirements. Thus, little noise is injected into the power system. Speed loop gain is adjusted depending upon whether the motor is motoring or regenerating. This motor control system is thus efficient to operate, economical to build and very quiet.

9 Claims, 5 Drawing Figures

ELEVATOR MOTORING AND REGENERATING DYNAMIC GAIN COMPENSATION

TECHNICAL FIELD

This invention relates to elevators, in particular, loop gain compensation in elevators.

BACKGROUND ART

It is well known that the speed and torque of a polyphase induction motor is a function of the frequency of the alternating power that is supplied to the motor and the voltage that is applied to the windings.

It is also well known that the motor can operate at either a synchronous speed, the same frequency as the power to it, and an asynchronous speed, higher or lower than that frequency. It operates at the synchronous speed when the motor is under no load and at the asynchronous speed when the motor is under load or being driven. The speed difference is known as slip, the magnitude of which dramatically impacts the motor's efficiency and performance.

Therefore, the typical polyphase motor is given requirements for maximum slip by the manufacturer, typically about ± Hz., depending on the motor design and whether it is motoring or regenerating, or braking. To develop maximum torque and maximize motor efficiency, the slip under load conditions should be held at that figure. For instance, if a two-pole motor is powered from a 60 Hz. source during motoring, the speed of rated torque would be about 3540 r.p.m., that being a positive slip of +1 Hz.

Following a converse concept, but using the same criteria, if the motor is moving at a speed which is greater than the frequency, power can be supplied from it or regenerated back to the source. The slip also should be maintained within those limits in this case. But, for regeneration or braking, the speed of the motor may be, for instance, 3660 at rated torque, in which the slip is −1 Hz., this being negative slip.

So, it is not surprising that many techniques have been tried to control slip precisely; however, most have met with less than desirable results because they are too costly, too complicated or do not provide good performance.

In an elevator slip control it is particularly important and demanding because motor performance there must be superior to that in most other applications. For instance, for a comfortable ride the motor must be accelerated and decelerated smoothly, without vibration and noise; yet, for system speed it must be fast. It should also be efficient, which means it should regenerate power, and, naturally, it must be operated in such a way as to provide precise car positioning at the floors. Most important, the motor must often be operated at near zero speed, at which precise frequency control is critically important for smooth performance.

DISCLOSURE OF INVENTION

An object of the invention is to control loop gain of an A.C. motor control in an elevator as a function of whether the motor is motoring or regenerating.

According to one aspect of the present invention, a polyphase motor is powered by an inverter that is powered by a D.C. power source, such as a battery which is charged by a battery charger. The inverter is controlled in such a way that the motor slip is controlled to achieve maximum torque and also maximum regeneration to charge the battery. The inverter's output frequency and magnitude are also controlled to control the motor's speed and torque.

According to another aspect of the invention, the inverter may be controlled by a device that provides signals that represent a computed motor speed and slip. Using these signals, the inverter is driven so as to follow a sine curve pattern that is at the desired frequency for the computed slip and at a desired magnitude to achieve desired motor operation with that slip. These signals are digitally produced by sensing the motor shaft position and constantly accumulating count and augmenting that count in proportion to the desired slip. The accumulated count occurs in some particular period of time that corresponds to onequarter of the period of that sine curve. Taking into account the characteristic interrelationship between the various phases of the signals that are to be supplied to the motor, the relative instantaneous Y-value on the sine curve signal at each phase is produced from that count. The Y-value is adjusted up and down to reflect the instantaneous levels for each phase that drives the inverter. This yields a signal which is supplied to each phase input on the inverter by a switching arrangement. The magnitude of that signal is scaled up or down to control motor current or voltage. Hence, starting with a simple count that represents motor speed and shaft position and adding some numbers to that, a multiphase drive is provided to the inverter to control motor speed, slip and torque.

According to the invention, to generate the signals that power the inverter, the actual motor speed is compared with a dictated motor speed to provide a basic torque signal which then is processed to provide a second torque signal that is subsequently employed to control the inverter.

One aspect of that comparison is, according to the invention, that loop gain of the system is adjusted up and down as a function of motor speed and direction to equalize the loop gain when the motor is motoring and regenerating to compensate for different gain characteristics in the inverter and its controls under those modes of operation.

A feature of the invention is that the control is universal; it can be used on all multiphase motors, by augmenting the motor speed count with different pole configurations, and, being that it is not inherently frequency limited, it can control a motor over very wide speed ranges, especially at near zero and low speed, hence making it very attractive for elevators. At the same time, by providing for very precise slip control, the invention optimizes regeneration of power back into the battery, and that is a feature which is particularly useful in an elevator system where regeneration occurs about 30% of the time because the load is counterweighted.

Other objects, benefits and features of the invention will become apparent to one skilled in the art from the description that follows.

BEST MODE FOR CARRYING OUT THE INVENTION

Figure 1:
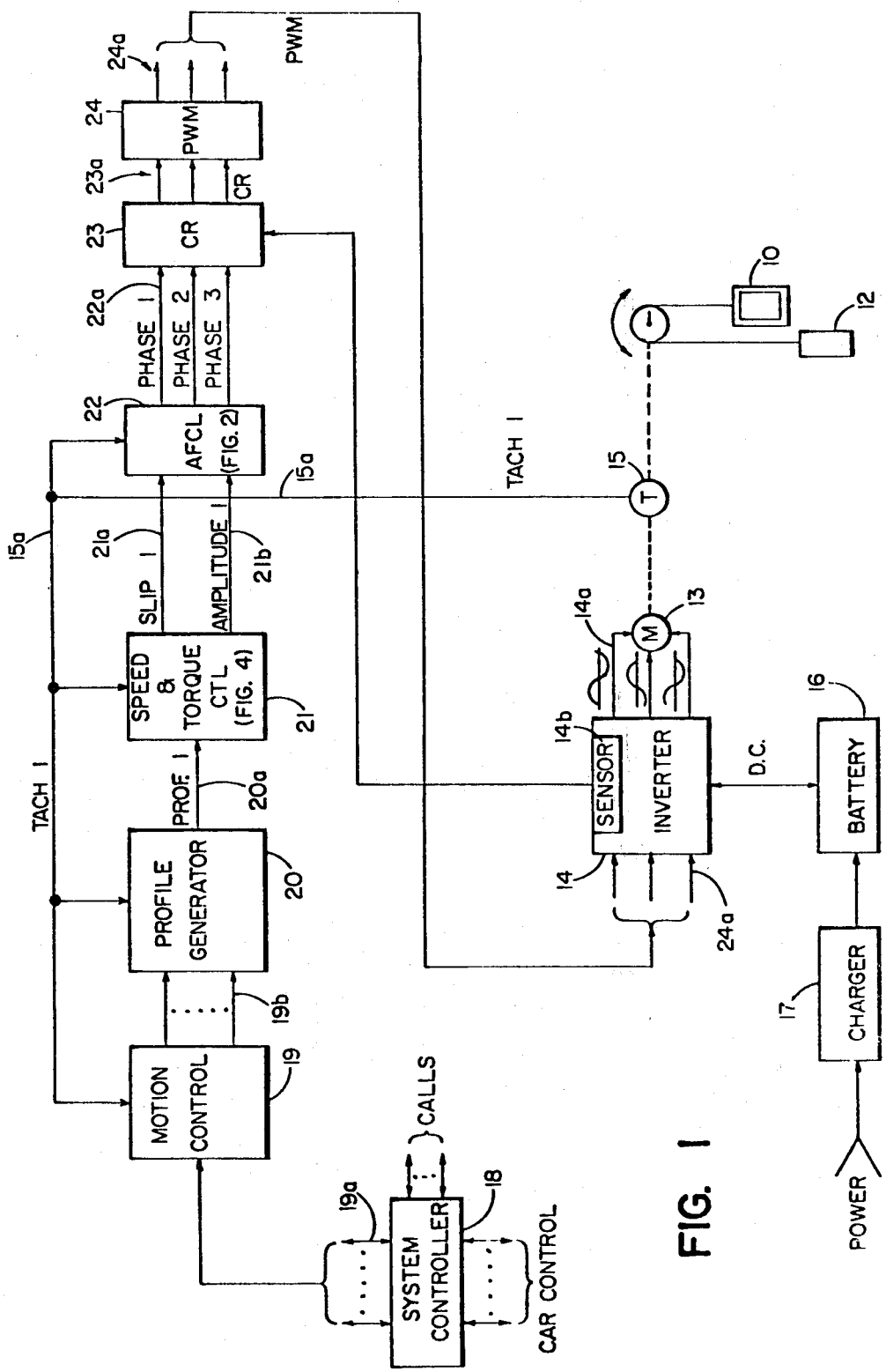
FIG. 1 is a block diagram of an elevator system which embodies the present invention, that system utilizing an inverter to drive a 3-phase motor, and that inverter being powered by a battery and controlled in accordance with the present invention.

FIG. 1 shows an elevator control system which includes a number of functional components that are well known and whose design is not critical to the invention. Hence, those components are not described in detail, except to the extent that is needed to describe the invention.

In FIG. 1 an elevator car 10 is connected by a cable 11 to a counterweight 12. The car is connected to the phase induction motor 13 which receives 3-phase power from an inverter 14. The motor drives a tachometer 15 (shaft encoder) which produces a tachometer output, TACH 1 signal, on the line 15a, that signal reflecting the instantaneous speed of the motor. The tachometer may also be used to provide an indication of the car's position, or a primary position transducer 9 may be used for that where it provides a car position signal. The inverter receives DC power from a battery 16, and the battery is charged by a charger 17 which is connected to a power source. The D.C. power may flow to and from the battery through the inverter. Power may flow to the battery be regeneration from the motor as a result of the motion of the car in one direction (e.g. dther electrical noises that can build up in the power system and disturb other equipment connected to it.

A system controller 18 receives car controls and calls, and in response communicates with a motion controller 19 over a plurality of lines 19a. The motion controller sends signals from lines 19b to a profile generator 20 which, in a predetermined or programmed manner, establishes a particular motion or velocity profile for the elevator car to move in response to the motion control, this concept being shown in numerous patents. The profile generator provides an output, PROF 1 signal, on line 20a which is supplied to a speed and torque control 21. This speed and torque control unit provides, in response to the PROF 1 signal, a first DC signal, SLIP 1 signal, on line 21a, the SLIP 1 signal reflecting a desired slip for the particular PROF 1 signal generated by the profile generator. The profile generator also provides, on line 21b, a second DC output, AMPLITUDE 1 signal, which represents the desired amplitude of current (or voltage) to the motor winding to move the car as desired.

The interrelationship between the SLIP 1 and AMPLITUDE 1 signals determine the torque and speed of the motor, and the interrelationship is established through feedback control, that control centering on sensing the TACH 1 signal, supplied from the tachometer, and supplying it to the motion controller, the profile generator, the speed and torque controller, which use it to generate their respective signals, and the SLIP 1 and AMPLITUDE 1 signals to obtain a desired motor performance characteristic at any instant to control the car motion as required.

The TACH 1 signal is also supplied to an amplitude and frequency control circuit (AFCL) 22 which also receives the SLIP 1 and AMPLITUDE 1 signal. The AFCL circuit uses those signals to generate PHASE 1, 2, 3 signals over the three output lines 22a, each of those signals comprising a staircase sine wave of high resolution, whose magnitude is varied in a selected relation to the AMPLITUDE 1 signal in order to control the car motion in a certain manner. The signals (PHASE 1-3) are phased apart as required by the phase of the motor (e.g. 0, 120, 240, for a 3-phase motor, the example shows), and their frequency reflects the desired motor speed and slip for a selected SLIP 1 signal. Their magnitude reflects desired motor current, that being controlled by the AMPLITUDE 1 signal.

These PHASE 1-3 signals that comprise the AFCL output are supplied to a current regulator (CR) 23, which then produces output CR signals, also sine waves, on its output lines 23a, these signals being provided to a pulse width modulator (PWM) 24. The PWM supplies corresponding output signals, PWM signals, each signal comprising a pulse whose duration varies in proportion to the magnitude of its corresponding CR signal. The PWM signals are supplied to the inverter on line 24a. The current regulator provides closed loop control of the motor current to ensure that it accurately tracks the PHASE 1-3 signals. This type of control is well known in the field.

The PWM signals that are supplied from the PWM to the inverter turn separate sections or portions of the inverter on and off in direct proportion to the duration of the pulses in the PWM signal. The inverter turns the battery voltage on and off in proportion to the duration of the pulses that comprise the PWM signals, that voltage being applied on the lines 14a to the motor windings. Because the duration of those pulses that drive the inverter are interrelated in a sinusoidal fashion by the AFCL circuit, the average values of the pulses on the inverter output are sinusoidal also. But, even though the output signal on each of the lines 14a from the inverter comprises voltage pulses, the inductive characteristics of the motor result in a sinusoidal current (I) through the motor over each of the lines 14a the frequency of that current being the primary frequency of the PHASE 1, 2, 3 signals. The harmonics are dramatically suppressed due to the motor's inductance, and, hence, the inverter provides, in effect, sinusoidal 3-phase current to the motor, that current being in response to digital pulses that reflect the current's frequency, magnitude and the phase relationship among the motor's windings. This current I is adjustable in its frequency and its magnitude, through which the motor speed, torque and slip are controlled. This adjustment is accomplished through the AFCL circuit 22, the detailed description of which follows.

Figure 2:
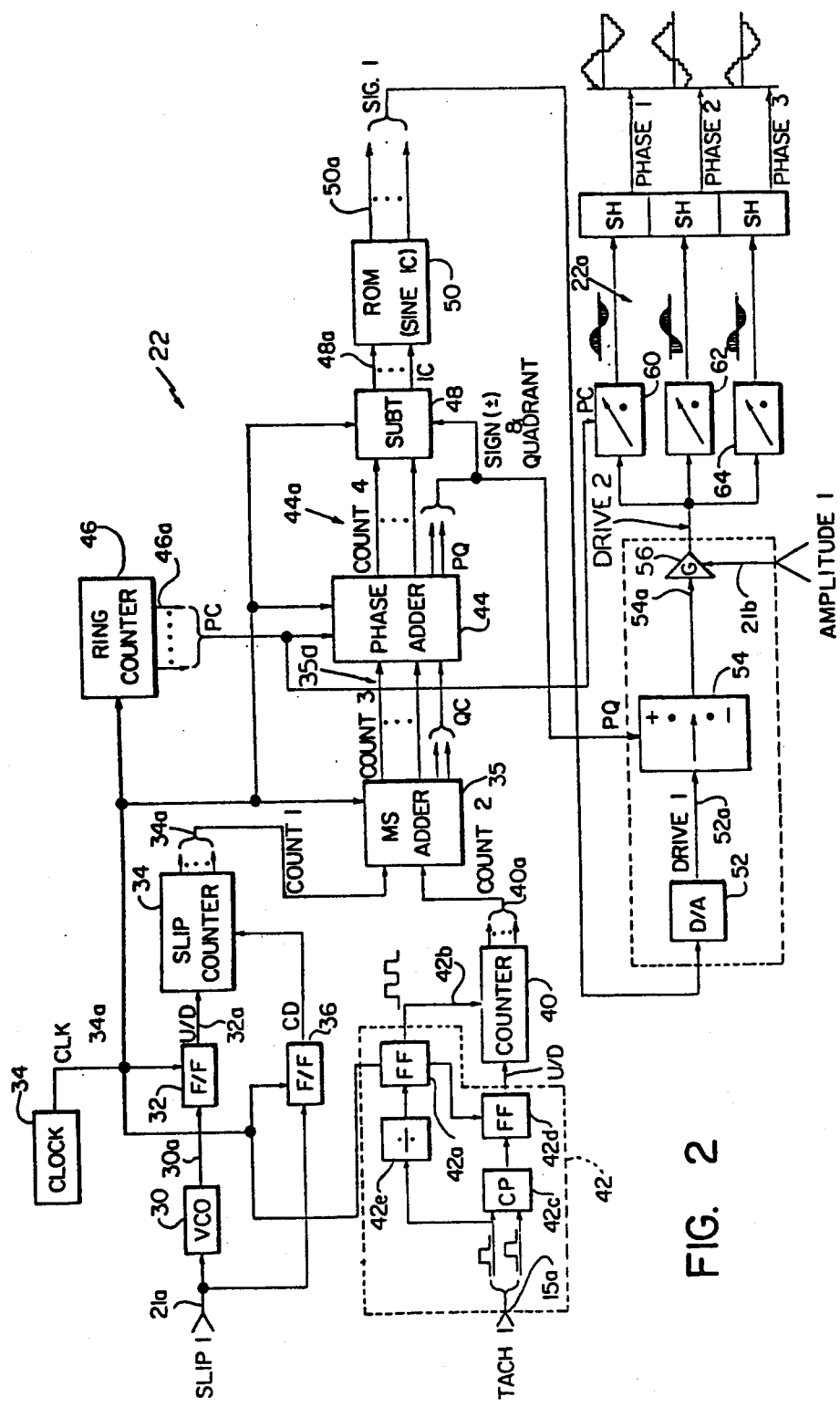
FIG. 2 is a block diagram of an amplitude and frequency control (AFCL) that is used in the system in FIG. 1 to drive the inverter to obtain slip, torque and speed control.

FIG. 2 shows the AFCL circuit 22. The AFCL circuit receives the SLIP 1 signal and also the AMPLITUDE 1 signal. The SLIP 1 signal is applied to a voltage controlled oscillator (VCO) 30 which produces an output VCO signal, on line 30a. The VCO signal, which is supplied to a flip-flop 32, consists of a string of pulses whose frequency (VCO frequency) F1 varies in proportion to the DC level of the SLIP 1 signal, which can be adjusted between predetermined positive and negative values, those levels defining a motor speed range, over which the frequency of the VCO may vary to control motor slip.

The flip-flop 32 also receives a CLK output signal from a clock 34; that signal strobes the signal from the VCO to the flip-flop output, producing a flip-flop output signal, also a string of pulses at F1, which are supplied over line 32a to a SLIP counter 33; it counts those pulses. The SLIP counter continually counts up, and on reaching its maximum count (e.g. N bits) starts over. So, its output is actually a signal, COUNT 1, reflecting the count at any instant.

Figure 3:
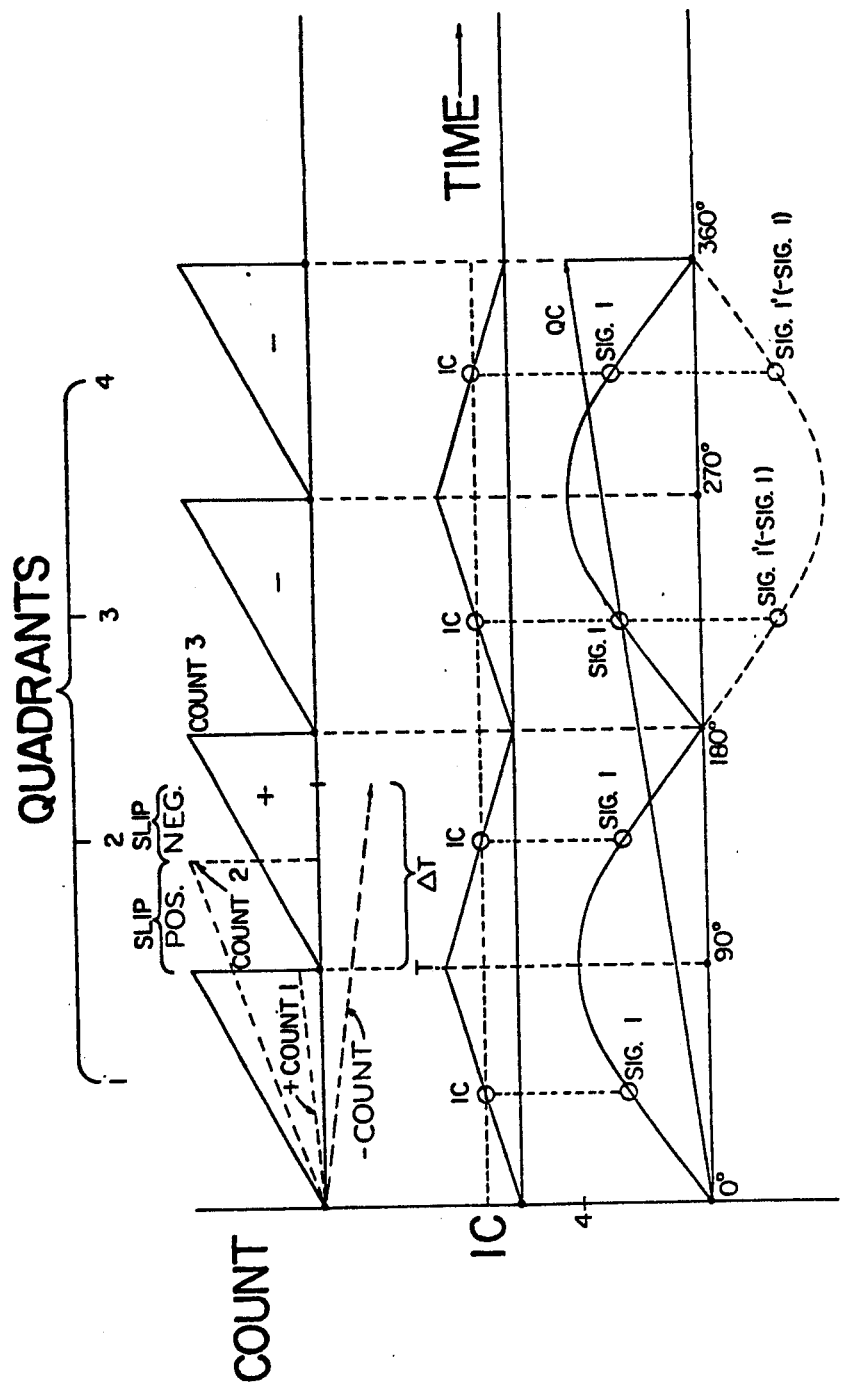
FIG. 3 consists of several waveforms that are in a common time base.

FIG. 3 shows this type of recurring count over time, the Y coordinate there representing the digital output or COUNT 1, the X-coordinate time.

The SLIP 1 signal is also supplied to a second flip-flop 36. Also strobed by the CLK signal, this flip-flop is responsive to the polarity of the SLIP 1 signal, changing state from high to low depending on that polarity in order to provide a count direction signal, CD signal, that commands the SLIP counter to count up or to count down. COUNT 1, from the SLIP counter, is supplied on lines 34a to a motor speed (MS) adder 38, which also receives the output from another counter, speed (SPEED) counter 40, over the lines 40a.

The SPEED counter receives the output from a circuit 42 which includes a flip-flop 42A. This flip-flop 42A provides on its output lines 42B a train of square wave pulses. These are provided in response to the output from a divider circuit 42E which receives the TACH signal that is supplied on the line 15a. That line actually comprises two lines, each of which provide a square wave pulse relative to each other, the pulses on these lines being in quadrature (90° apart).

The divider circuit 42E receives the square wave pulses on one of these lines and provides, as its output, trigger pulses which are at a repetition rate that is equal to or lower than the repetition rate of the square wave pulses provided to its input. The output from the flip-flop 42 is provided to the input of the SPEED counter 40.

Both of the signals that comprise the TACH signal are also supplied to a comparator circuit 42C, and this circuit produces, in response, an output signal, which, depending upon the relationship between those two pulses (i.e. which one leads, which one lags), represents the direction in which the motor is turning. The output from the comparator 42C is then supplied to a flip-flop 42D, which, in response, produces an output signal which is either high or low. This signal is supplied to the count control terminal on the counter 40 to command it to count up or count down the pulses from the flip-flop 42A, depending on whether the signal is high or low. Just like the SLIP counter, the SPEED counter also continuously counts up, resets, and then counts up again. It can also count down depending on the output from the flip-flop 42D. The result is an output signal, COUNT 2, from the counter 40. This signal is also shown in FIG. 2. The repetition rate for COUNT 2 is F2, which is in proportion to the motor speed, since they are generated from the motor's rotation. The pulses that comprise the TACH 1 signal are generated very rapidly during each rotation of the motor, the effect of this being that the rotational position is resolved very precisely. The purpose for the divider then becomes correlating that count to the driving frequency of the motor, which is necessary in order to take into account the number of poles in the motor, since the number of poles determines the speed of the motor. This correlation is important because the repetition rate F2 should correspond to the driving frequency. For example, comparing a four-pole and two-pole motor, the shaft position in the four-pole motor must be resolved so that the COUNT 2 is produced more rapidly per revolution. Hence, the TACH signal must be divided by two for a two-pole motor, otherwise F2 would be too high - the motor would not be synchronized within the slip range. (This assumes that the same tachometer is used, further, the count/ revolution would be the same regardless of motor speed.) The reason for this will become even more apparent from the remaining portions of this description, which will show that from the basic frequency F2, a higher or lower frequency is established from the COUNT 1 signal in order to vary the driving frequency from that of the actual motor speed, this being done in order to control slip.

The MS adder adds COUNT 1 and COUNT 2, producing at its output lines 35a, an output COUNT 3 which is the sum of the two. The effect of adding COUNT 1 and COUNT 2 is to shorten the time it takes to obtain a particular COUNT 3, and thus shorten T in FIG. 3. In other words, as the SLIP counter counts up, the slope of waveform A will increase because T becomes less. As it counts slower, the slope will be less because T will increase. So, by changing the VCO frequency, T can be increased and decreased in proportion to COUNT 1, that range being the SLIP RANGE or Δt, that defining a change in frequency between F1, the frequency of COUNT 1, and F2, the frequency of COUNT 2.

As explained later in detail, to maintain a certain slip, COUNT 1 is controlled to be higher or lower than COUNT 2 by an amount that equals the slip that is desired (e.g. specified for the motor). The overall action of the AFCL circuit on the motor's operation is represented by this equation (1).

$$F\ SYNCH = \pm F(MOTOR) \pm F(SLIP) \qquad (1)$$

Here, F SYNCH is also the frequency (F3) of the PHASE 1-3 signals, which is the inverter driving frequency. FM is the motor speed and COUNT 2 is a function of it, but may be ± depending on the direction of rotation, because COUNT 2 can be a down count or up count. F SLIP, the same as the VCO frequency, may be ± depending on the SLIP signal, which may be ± to effect ± slip. Thus, a smooth transition between motor functions is obtained, which is important for leveling at "close speed" (near zero speed).

In addition to COUNT 3, the adder 35 also provides a digital output, QC signal, which is a representation of the number (0–4) of cycles made by the COUNT 2. Each cycle is a quadrant, representing 90° in a full cycle of 360°. To do this, the MS adder output may have N bits, but actually use N-X bits for COUNT 3, and the remainder of the N bits for indicating the quadrant and the sign of the sine curve in that quadrant.

COUNT 3, from the MS adder, is supplied to a second adder, the PHASE adder 44. The PHASE adder 44 also receives, on the lines 46a, a phase identification (PC) signal, from a ring counter 46, that signal being provided in response to the CLK signal. The PC signal identifies, at any instant in time, one of the desired phases, i.e. windings (e.g. 0°, 120°, 240°). This PC is a number which, if added to COUNT 3, would reflect what would be COUNT 3 at that phase; that is, a phase shifted by some amount reflected in the PC signal. In other words, the ring counter continually provides a "circulating digital" number which, when added to COUNT 3, reflects a count for one of the phases. The PC signal is also added with the QC signal in the PHASE adder, producing a PQ signal that represents the right quadrant for the phase for the PC signal, since the quadrant may be different for a different phase. Thus, the output from the PHASE adder 44 includes (1) an instantaneous digital representation, COUNT 4, of the count for a particular point X or counts for one phase, and (2) a digital representation of the quadrant for the PQ signal and its sign.

COUNT 4 represents the coordinate for any point on the SINE curve in FIG. 3, but only between 0°–90°. From the two, the proper point on the SINE curve for that coordinate is generated at any instant. This is done in the AFCL circuit for each phase, each time the PC signal changes, which occurs at the CLK rate.

COUNT 4 and the PQ signal are supplied to a subtractor unit 48, over the lines 44a. In response to the PQ signal, the subtractor provides an output, the IC signal, which is the proper coordinate value for the quadrant indicated in the PQ signal for COUNT 3. The subtractor counts down from the COUNT 4 signal for other quadrants during the presence of a PQ signal identifying that quadrant which, if not present, inactuates the subtractor. Then, it can be seen that the effect of the PC signal is to shift the IC signal between 0°, 120° and 240°.

The IC signal from the subtractor is a coordinate (e.g. X), and it is furnished on lines 48a to a lookup table, ROM 50. That IC signal addresses a particular number in the lookup table, that number corresponding to the sine value for a point on the SINE curve between 0°–90°. The ROM thus produces, on its output lines 50a, a digital output, SIG 1, that is the sine value for the coordinate identified by COUNT 3, but still uncorrected for the *polarity* for its quadrant. The SIG 1 signal is supplied to a digital to analog (D/A) converter 52 which produces an analog output, DRIVE 1 signal, on line 32a. This DRIVE 1 signal is supplied to a switch circuit 54, which also receives the PQ signal and, depending on what quadrant that identifier identifies, switches the DRIVE 1 signal between a positive or negative value, which gives the DRIVE 1 signal the right polarity for the quadrant. For example, the SIG 1 signal (so also DRIVE 1) would be negative in quadrants 3 and 4, as shown by the broken sine curve containing SIG 1' (SIG 1' being SIG 1 on the true sine curve). Thus a full sine curve is generated through the four quadrants shown over time—as different SIG 1 signals are provided and given the right polarity.

From the switch circuit the DRIVE 1 signal is supplied on line 54a to an amplifier (G) 56, whose gain is controlled in response to the magnitude of the AMPLITUDE 1 signal, in order to produce an output, DRIVE 2, whose magnitude is proportional to the AMPLITUDE 1 signal. This DRIVE 2 output signal is simultaneously supplied to three switches 60, 62, 64, each one corresponding to one phase drive of the inverter, each providing one of the PHASE 1, 2, 3 signals. These three switches receive the PC signal from the ring counter 46, that signal identifying the phase for the DRIVE 2 signal, and, depending on what that signal is, one of these switches is actuated, which transfers the DRIVE 2 signal to correct one of the sample and hold circuits 55, which produces a staircase sine signal over time—as the DRIVE 2 signal is generated. The SH outputs are the PHASE 1, PHASE 2 and PHASE 3 signals.

The PHASE 1, PHASE 2, PHASE 3 signals are thus phased according to the PC signal and are at a common frequency, F SYNCH (see equation 1).

To demonstrate this slip control, this example is provided. Assume a two-pole AC motor at 3600 r.p.m., that is, driven by variable frequency drive using the invention; what are the frequencies of the VCO output (F1) and TACH signals and slip characteristics required for, (Case 1) zero torque; (Case 2) positive driving torque; and (Case 3) negative regeneration or braking using a constant AMPLITUDE 1 signal.

Case 1:
 FM=60 Hz.
 F SLIP=0
 F SYNCH=60 Hz.
 VCO frequency=0
 TACH frequency=1024 pulses/second
Case 2:
 FM=60 Hz.
 F SLIP=+1 Hz.
 F SYNCH=61 Hz.
 VCO frequency=+170
 TACH frequency=1024 pulses/second
Case 3:
 FM=60 Hz.
 F SLIP=−1 Hz.
 F SYNCH=59 Hz.
 VCO frequency=−170
 TACH frequency=1024 pulses/second Hence, with this system the car can be moved from zero to full speed at a controlled rate and with a controllable slip, by controlling the SLIP 1 and AMPLITUDE 1 signals.

Figure 4:
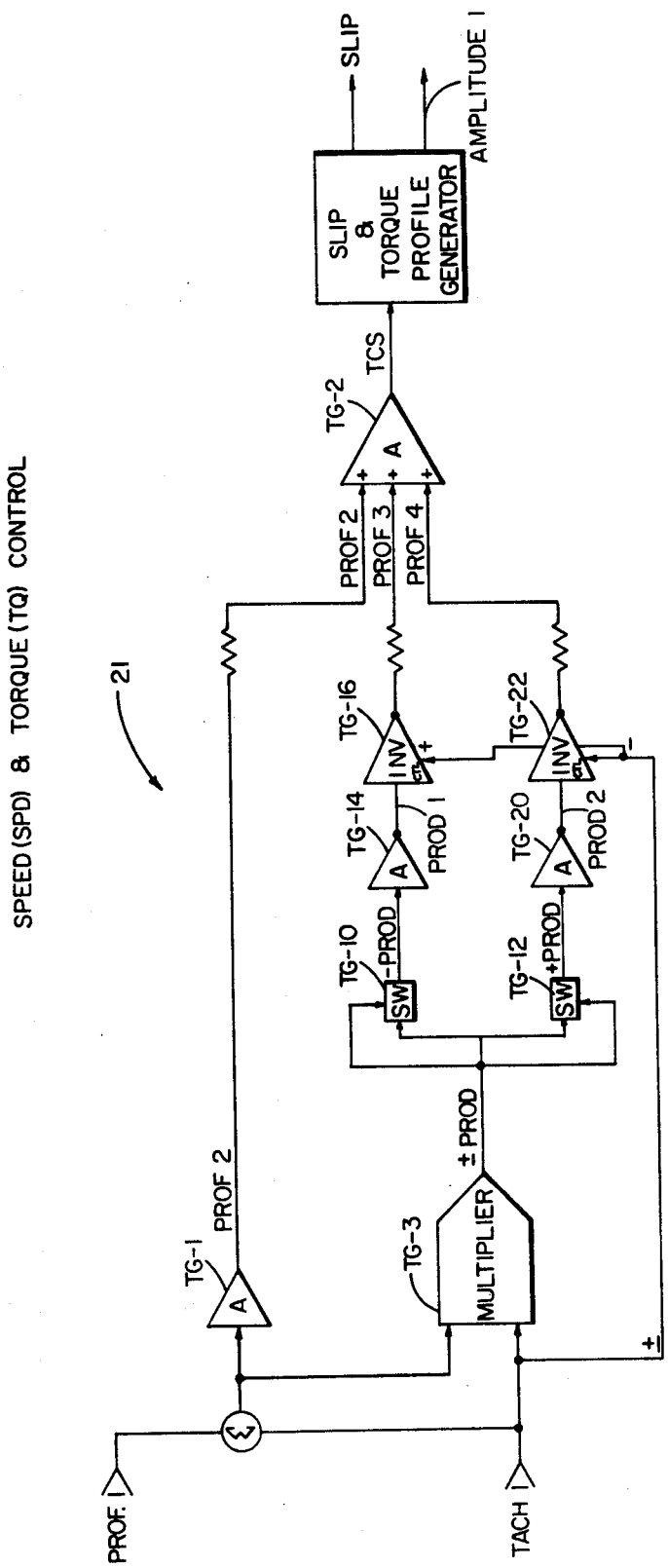
FIG. 4 is a block diagram showing the torque control in FIG. 1.

The speed and torque control 21, shown in FIG. 4, receives the TACH 1 and PROF 1 signals and processes them to provide the SLIP and AMPLITUDE 1 signals which are employed to control the motor's speed and slip. Torque controls for processing such signals in this fashion are very well known. The control 21, however, is quite different, providing additional processing that significantly improves the motor control accuracy.

The torque control 21 uses the PROF 1 signal and the TACH signal to determine if the motor is motoring or regenerating and adjusts the gain through the torque control 21 so that when it is motoring, the gain increases with motor speed, and when regenerating, the gain decreases with motor speed. This is done to compensate for gain variations in other portions of the closed loop motor control, e.g. in the inverter. In those portions, the gain characteristics have been found to be such that when the motor is motoring, the gain has a tendency to drop off (increase inversely) with motor speed, the opposite occurring during regeneration. The adjustable gain control that is provided by the torque control 21 compensates for this, producing a relatively flat gain characteristic to improve performance.

In the torque control 21 the PROF 1 signal, which represents the dictated or desired motor speed, is supplied to the summing junction at an amplifier TG-1. The other input to this summing junction is the TACH 1 signal. The output of this amplifier, the PROF 2 signal, is a function of the difference, the ERROR signal, between the PROF 1 and TACH 1 signals, and the PROF 2 signal is supplied to one input of a summing amplifier TG-2; its output being a torque control signal TCS which is supplied to a slip and torque profile generator TC-8. This profile generator produces the SLIP and AMPLITUDE 1 signals. (It is not described in detail here for the reason that it is well known in the art how to construct apparatus which, in response to a signal, such as a TCS signal, produces two separate signals to control an inverter to control the speed and slip of a polyphase motor.) The ERROR signal is also supplied to one input of a multiplier TG-3. The other multiplier input is the TACH signal. The TACH signal not only provides an indication of the motor speed at any instant in time (as indicated previously), but also the direction in which the motor is moving, by its polarity, which may be either positive or negative, which correlate to up and down car motion. Similarly, the ERROR signal is either positive or negative depending upon the motor operation. The relationship between the polarities of the two signals at any instant in time indicates the motor's mode of operation—whether it is motoring or regenerating. This is shown in the following table. Columns A and C mean motoring (e.g. acceleration), B and D regeneration (e.g. deceleration).

|        | A | B | C | D |
|--------|---|---|---|---|
| TACH 1 | + | + | − | − |
| ERROR  | + | − | − | + |

To follow this table, the multiplier multiplies the ERROR and TACH 1 signals to produce a product, the PROD signal, whose polarity reflects their polarity. Its magnitude obviously is also a function of them. Thus, if the two signals have opposite polarities, the PROD signal will be negative. If they have the same polarity, it will be positive. The PROD signal is furnished to two polarity switch circuits TG-10 and TG-12. When the PROD signal is negative, the switch TG-10 operates, coupling the PROD signal to the switch's output. When the PROD signal is positive, the switch TG-10 is inoperative, but the switch TG-12 operates to couple the PROD signal to its output. From switch TG-10, the PROD signal is supplied to a fixed gain amplifier TG-14. The output from this amplifier, the PROD 1 signal, is supplied to a controllable inverter TG-16. It inverts only if the polarity of the TACH 1 signal, supplied to its control (CTL) input, is positive; otherwise it is noninverting. The output amplifier TG-16, the PROF 3 signal, is supplied to one of the two remaining inputs on the summing amplifier TG-2 to produce the TCS signal, which is the sum of the PROF 2 and PROF 3 signals.

When the output from the multiplier TG-2 is positive, however, the output from the switch TG-12, the negative PROD signal, is coupled to a fixed gain amplifier TG-20 whose output, the PROD 2 signal, is supplied to another controllable inverter TG-22 to produce the PROF 4 signal. This inverter, opposite to inverter TG-16, inverts the PROD 2 signal when the TACH 1 signal, on its CTL input, is negative; otherwise it is noninverting. The output from this amplifier, the PROF 4 signal, is supplied to the third and last input to the summing amplifier TG-2. Thus, when the PROD signal, the multiplied TG-3 output, is positive, the TCS signal is the sum of the PROF 2 and PROF 4 signals.

Figure 5:
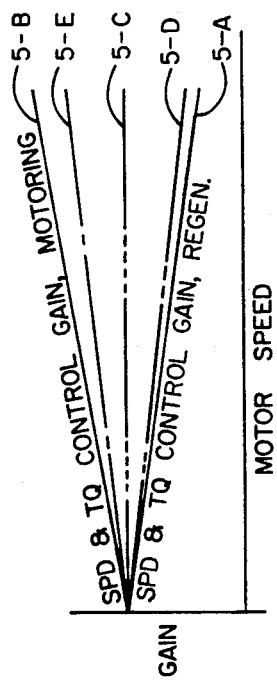
FIG. 5 is a graph showing the gain characteristics of the torque as a function of motor speed and direction and the gain characteristics of the system for the same parameters.

FIG. 5 shows the result graphically. The open-loop gain characteristics of the speed and torque control, the line 5-A, is such that as the speed of the motor increases, the gain decreases, due to the multiplier. Thus, for a constant ERROR signal, the TCS signal decreases, increasing motor speed. The opposite occurs for motoring, shown by line 5-B. As motor speed increases, the open-loop gain increases, thus the signal TCS increases, for a constant ERROR signal. FIG. 5 illustrates how this compensates for the drive characteristics elsewhere in the system to produce a flat gain characteristic, the line 5-C. This is needed because experimental findings seem to show that the gain characteristics during motoring, the line 5-C, are such that the gain drops off with motor speed. The gain characteristics of line 5-B thus compensate for that to provide the flat characteristic of the line 5-C. During regeneration, the gain characteristics, the line 5-E, oddly increase with motor speed and, thus, the compensation of line 5-A compensates for this to provide the flat characteristic of the line 5-C.

Obviously, various operations in this system may be performed with computer-based equipment. Discrete portions have been used in this description for illustrative purposes to demonstrate one way to implement the invention. To one skilled in the art there will be modifications and variations that can be made to the embodiment that has been shown and described without departing from the true scope and spirit of the invention. Some of those variations may include the use of a computer to carry out a number of functions performed in the discrete system comprising the AFCL circuit.

Needless to say, other applications for the invention exist. For example, it can be used to drive a cycloconverter, rather than an inverter, in order to power the motor. That is to say, the AFCL circuit can be used to provide sine related signals to operate the cycloconverter in order to provide AC power to a polyphase motor.

The use of the invention to control a 3-phase motor has been shown and described because it facilitates an understanding of the invention. Even so, it should be apparent to one skilled in the art that it could be used to control other motors, such as a 2-phase motor, simply by using the right phase signal relationship, in order to identify the phase windings and in order to generate the correct coordinate on the sine curve for the winding and establish the correct polarity for it.

Although the invention has been shown for use for controlling the current of the motor, it could be used to control motor voltage. Further, by correlating the amplitude and slip, different motor and slip controls can be obtained, e.g. one signal can dictate motor torque.

From the foregoing it will be seen that there are many applications for the invention to control induction motors and that the invention may be carried out in many ways, perhaps through computer utilization for carrying out various computational type functions that are performed by the discreet circuits and units that have been described. This may, in fact, be an economically attractive alternative to using such items as the adders, counters and flip-flops, which simply provide a convenient, comparatively low cost way to perform certain functions that could be done in a computer, for example, one using a microprocessor.

Other modifications, variations and alterations may be made to the embodiments of the invention that have been described without departing from the true scope and spirit of the invention as described in the claims that follow.

We claim:
1. An elevator comprising:
   a polyphase electric motor, said motor having N phases and corresponding windings, N being two or more;
   a battery;
   a battery charger;

an inverter for providing current or voltage to each stator winding in the motor, said inverter having an input for each winding and a corresponding output;

a position encoder for providing a signal (TACH) that identifies the motor shaft position, its speed and direction;

an elevator car that is propelled by the motor;

an elevator control system for controlling the operation of the inverter to produce alternating N phase current or voltage for said stator windings to control motor speed (r.p.m.), slip and direction;

the elevator system being characterized in that said control system comprises:

means for providing a signal (AMPLITUDE) in response to the TACH signal to control motor speed (r.p.m.);

means for providing a signal (SLIP) in response to the TACH signal to control the difference between the motor r.p.m. and the frequency (F SYNCH) of the alternating current or voltage that is supplied to the motor by the inverter;

means responsive to the SLIP signal and TACH signal for providing a signal that repeats at F SYNCH, said signal identifying an angular position on a sine curve, and for providing N second signals, each representing the Y-coordinate on said sine curve at different angular positions thereon, said positions being equally spaced apart by 360°/N, said N second signals being provided in a successive sequence during each motor rotation, the sequence in one motor direction being the reverse of the sequence in the opposite direction;

means for varying the magnitude of each second signal as a function of the AMPLITUDE signal;

means for applying each second signal to one of the inverter inputs according to said successive sequence;

means for providing a dictated motor speed signal in response to the TACH signal, said dictated motor speed signal representing a desired motor speed; and means for providing a torque control signal in response to said dictated speed signal and said TACH signal and varying said torque control signal in relation to the motor speed for a constant dictated speed signal;

said means for providing said AMPLITUDE signal and means for providing said slip signal being responsive to said torque control signal.

2. An elevator according to claim 1, characterized in that:

said means for providing said torque control signal comprises means for increasing said torque control signal in relation to motor speed when the motor is motoring to produce positive torque, and decreasing said torque signal in relation to motor speed when the motor is regenerating, producing negative torque.

3. An elevator according to claim 2, characterized in that:

said means for increasing said torque signal comprises means for summing a correction signal with an uncorrected torque signal for the difference between actual motor speed and the dictated speed, the magnitude of said correction signal, for a given dictated speed signal, increasing with motor speed when the motor torque is positive, and decreasing with motor speed when the motor torque is negative.

4. An elevator according to claim 3, characterized in that:

said means for providing said correction signal comprises means for providing an error signal that represents the difference between the dictated motor speed and actual speed and means for multiplying said error signal and said TACH signal to provide a bipolar signal, whose polarity is opposite that of the error signal when the motor produces negative torque, but of the same polarity when the motor produces positive torque.

5. An elevator comprising:

a polyphase electric motor, said motor having N phases and corresponding windings;

a D.C. power source;

means for providing current or voltage from said source to each stator winding in the motor;

an encoder for providing a signal (TACH) that represents motor speed and direction;

an elevator car that is propelled by the motor;

an elevator control for controlling the operation of the means for providing current or voltage to produce alternating N phase current or voltage for said stator windings to control motor speed, slip and direction;

the elevator being characterized in that said elevator control comprises:

means for providing a signal (AMPLITUDE) in response the TACH signal to control motor speed;

means for providing a dictated motor speed signal in response to the TACH signal, said dictated motor speed signal representing a desired motor speed;

means for providing a torque control signal in response to said dictated speed signal and said TACH signal and varying said torque control signal in relation to the motor speed for a constant dictated speed signal;

said means for providing said AMPLITUDE signal and means for providing said torque control signal being responsive to said torque control signal.

6. An elevator according to claim 5, characterized in that:

said means for providing said torque control signal comprises means for increasing said torque control signal in relation to motor speed when the motor is motoring to produce positive torque, and decreasing said torque signal in relation to motor speed when the motor is regenerating, producing negative torque.

7. An elevator according to claim 6, characterized in that:

said means for increasing said torque signal comprises means for summing a correction signal with an uncorrected torque signal for the difference between actual motor speed and the dictated speed, the magnitude of said correction signal, for a given dictated speed signal, increasing with motor speed when the motor torque is positive, and decreasing with motor speed when the motor torque is negative.

8. An elevator according to claim 7, characterized in that:

said means for providing said correction signal comprises means for providing an error signal that represents the difference between the dictated motor speed and actual speed and means for multiplying said error signal and said TACH signal to provide a bipolar signal, whose polarity is opposite that of the error signal when the motor produces negative torque, but of the same polarity when the motor produces positive torque.

9. An elevator according to claim 5, characterized in that said D.C. supply comprises a battery and battery charger.

* * * * *